May 23, 1944.  L. V. McCARTY  2,349,443
BURNER CONTROL APPARATUS
Filed April 25, 1941  5 Sheets-Sheet 1
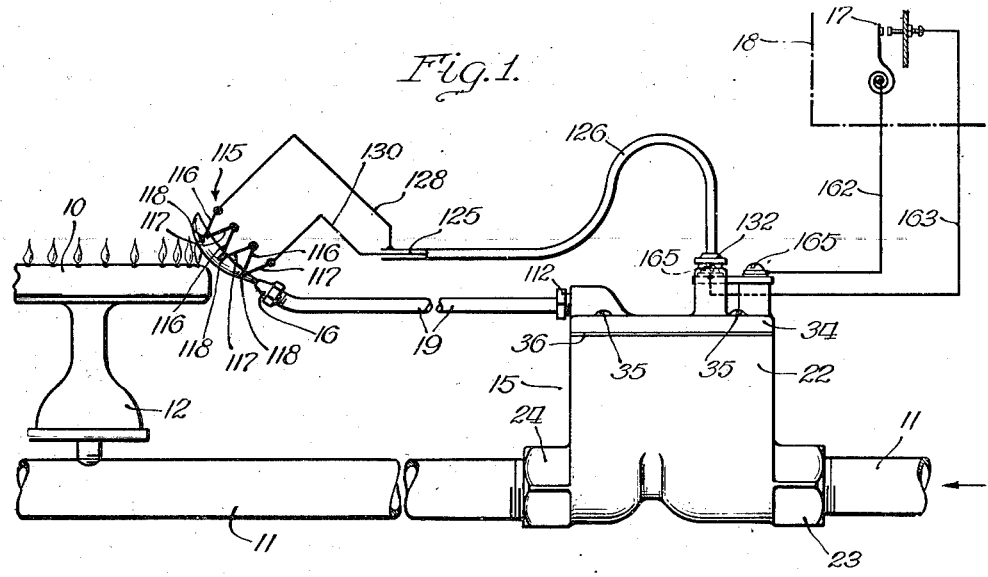
INVENTOR.
Lourdes V. McCarty
BY
Brown, Jackson, Boettcher & Dienner
Attys.

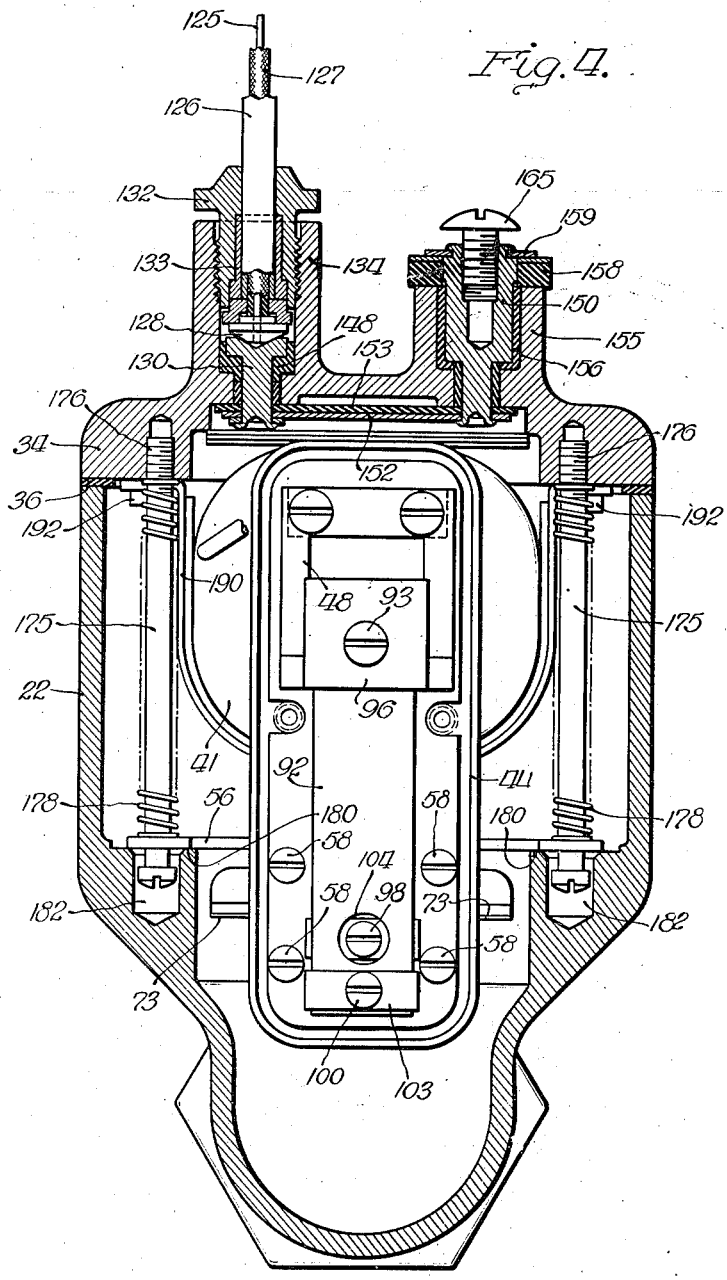

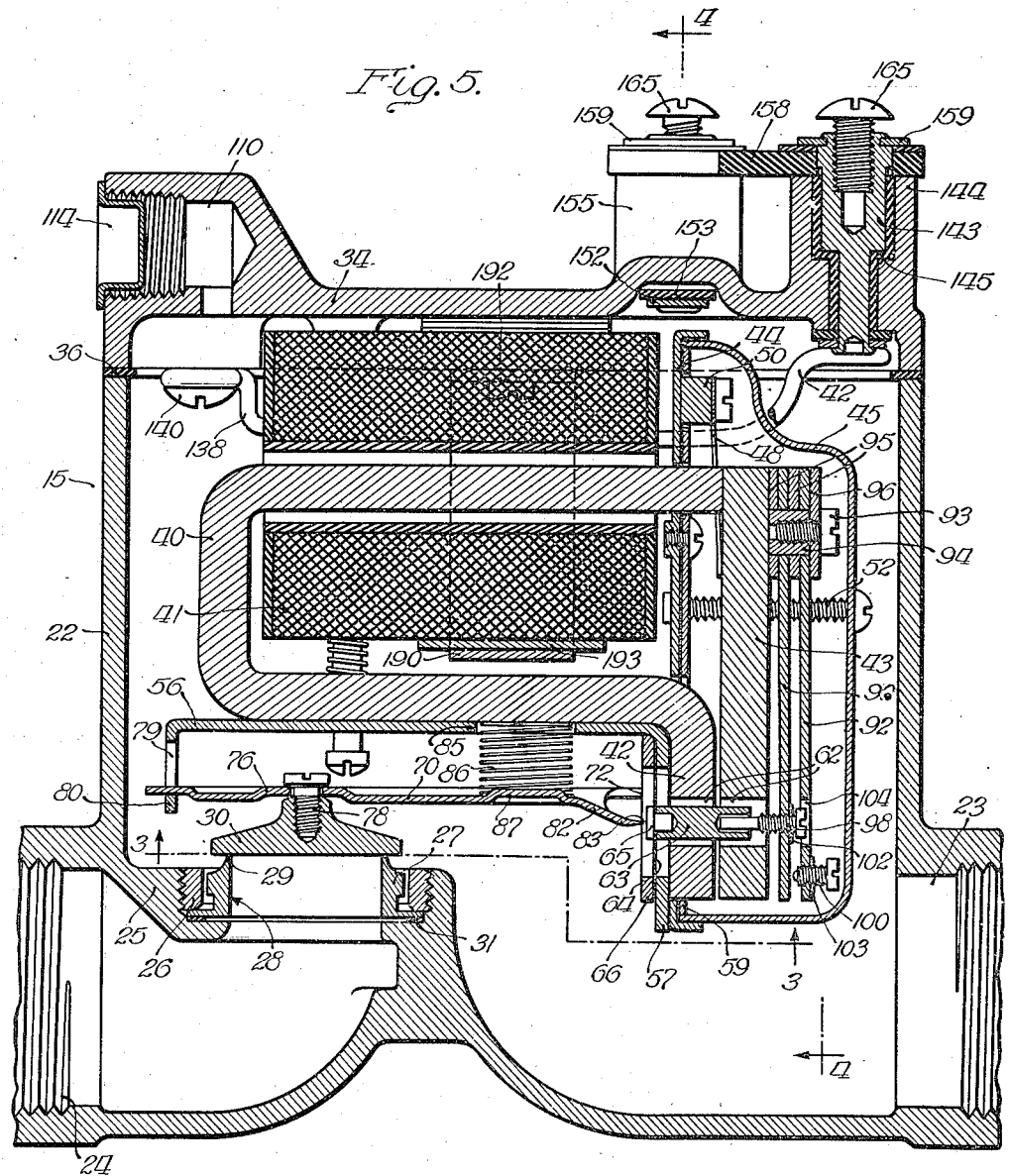

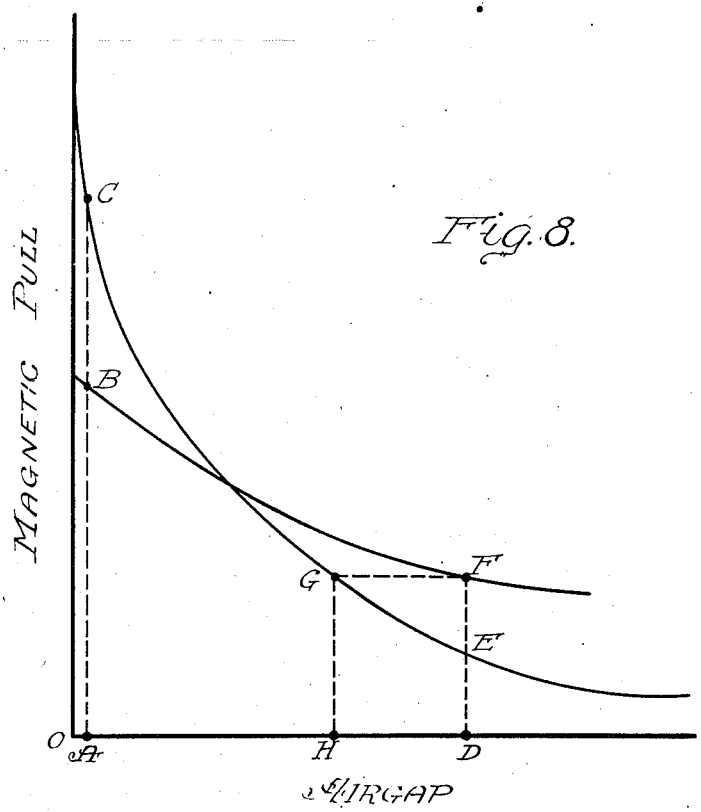

Patented May 23, 1944

2,349,443

UNITED STATES PATENT OFFICE 2,349,443

BURNER CONTROL APPARATUS

Lourdes V. McCarty, Milwaukee, Wis., assignor to Milwaukee Gas Specialty Company, Milwaukee, Wis., a corporation of Wisconsin Application April 25, 1941, Serial No. 390,247

13 Claims. (Cl. 175—336)

This invention relates, generally, to apparatus for controlling fluid flow in conduits, and it has particular relation to an improved burner control apparatus of the character employing an electromagnet, an electrical operating circuit for the electromagnet, and a thermoelectric generator energized by the heat of a flame for supplying current to the operating circuit.

The invention may be embodied in a wide variety of constructions for use with a wide variety of devices employing gas or other fuel burners. For purposes of illustration, I shall refer to a number of illustrative devices with which the present invention is adapted to be used, but it is to be understood that the invention is not necessarily limited to use with the particular devices herein set forth.

Due to the minute character of the maximum power that can be generated by the heat of a pilot light or other flame or source of heat on a thermoelectric generator, and the inability of this minute power to actuate the main shut-off valve or controlling member from closed or safety position to open or operating position, thermoelectric control and safety shut-off devices heretofore have usually required manual cocking or reset means, such as a cocking or reset button, for cocking or resetting the device after each operation to closed or safety position.

As a result, the usual thermoelectric control and safety shut-off devices have not and could not be automatic or completely self-operating. For example, if a thermostat or other condition-responsive control was employed for opening or disabling the thermoelectric circuit for operation of the valve to closed position at one predetermined temperature or other condition, and for closing or rendering the thermoelectric circuit operative at another temperature or condition, the closing or rendering operative of the thermoelectric circuit—with the pilot light or other flame burning and heating the thermoelectric generator—would not open the valve because the minute thermoelectric power would not accomplish that result.

Consequently, with the usual thermoelectric control devices heretofore provided, it has been necessary to reset the shut-off valve to open position not only after the failure of the pilot or other flame or source of heat, but also after each closing of the valve by the thermostat or other control means.

One of the main objects of the present invention is to eliminate the necessity of manual cocking or reset means and the necessity of a manual cocking or resetting operation, and to provide a thermoelectric control and safety shut-off device which is actuated to open position, as well as held in open position, through the instrumentality of the minute thermoelectric power, and which, therefore, is completely automatic or self-operating.

When an electroresponsive valve which is sealed against its seat by fluid pressure, for example, is analyzed, it is found that when the valve is closed it requires the greatest force to open it, and that as the valve opens, the force required to continue movement of the valve to open position decreases rapidly.

On the other hand, where an electromagnet and cooperating armature are employed, it is well known that the magnetic attraction between the electromagnet and armature is less when the armature is fully retracted, and increases as the air gap between the electromagnet and the armature is reduced upon movement of the armature to attracted position.

According to the present invention, I provide in connection with a device of the character set forth, means for storing energy by the movement of the armature to attracted position and for using this energy as it is required to operate the valve or other controlling member.

One of the chief features of the invention is the provision with a valve or other controlling member requiring for operation thereof, a force greater than the magnetic attraction between the electromagnet and the armature when the armature is fully retracted, of means for storing by movement of the armature to attracted position a force sufficient to operate the valve or controlling member, the energy storing means presenting increasing resistance to movement of the armature as it approaches attracted position, and, more particularly, presenting to the armature in all positions thereof in its movement to attracted position a resistance less than the magnetic attraction between the electromagnet and the armature at the corresponding position of the armature.

This permits storing of the amount of energy required to operate the valve without interfering with the movement of the armature, and the energy storing means is preferably of a character efficiently to utilize the increasing magnetic attraction between the electromagnet and the armature as the armature moves to attracted position for accomplishing the results set forth.

Another object of the invention is to provide means for storing energy by the movement of the armature to attracted position and for utilizing this energy to operate the valve or other control means wherein sufficient energy is stored to accomplish that result, the lesser energy stored by the lesser magnetic attraction in the initial movement of the armature to attracted position when combined with the greater amount of energy which is stored by the greater magnetic attraction as the armature approaches attracted position providing a force which is sufficient to operate the valve or other control means quickly, positively, and effectively.

Another object of the invention is to provide, in a device of the character set forth, a relatively simple, compact, inexpensive and improved energy storing and valve or other control member operating means which efficiently utilizes the progressively increasing magnetic attraction between the electromagnet and the armature as the armature moves to attracted position and which will operate effectively for the purposes set forth; also a device which will fail "safe."

Because of the minute power available for operating a unit of this kind, it is necessary to maintain an accurate relationship between the component parts thereof. Since it is desirable to obtain ready access for assembly and servicing, it is preferable to construct a device of this kind in such a manner that separating the housing exposes the parts involved in usual servicing and adjustment without further disassembling.

Therefore, another object of the invention is to provide an improved mounting for the electromagnetic operating unit and valve or controlling member assembly, and, more particularly, an improved form of resilient mounting for assuring accurate positioning of the valve disc or other controlling member with respect to the valve seat or cooperating part. This may be accomplished in various other ways than that shown and described.

In a magnet of ordinary construction, the magnetic attraction falls off so rapidly as the armature recedes from attracted position that only a small variation in air gap between the magnet and armature could be utilized fully to open a valve of the character here employed; also, with such a magnet when sufficient force is available with the armature in retracted position fully to open the valve, the magnetic attraction, when the armature is in attracted position, is much more than sufficient to start opening the valve against fluid pressure. It is therefore another object of this invention to decrease the ratio between the magnetic attraction with the armature in attracted position and the magnetic attraction with the armature in retracted position to enable the utilization of a greater variation in air gap and to permit more energizing current in the electromagnet coil at the point where the valve begins its closing movement than is possible with an electromagnet of ordinary construction.

While the particular structural features by which I obtain a device of the character set forth are important features within the more specific aspects of the invention, it is to be understood that the precise features shown and described may be varied within the broader aspects of the invention.

In order to acquaint those skilled in the art with the manner of constructing and operating devices in accordance with the present invention, I will now describe, in connection with the accompanying drawings, certain illustrative embodiments of the invention.

In the drawings:

Figure 1 is a fragmentary and more or less diagrammatic view showing an embodiment of the invention in a pilot burner and main burner gas supply system;

Figure 2 is a top plan view of the thermoelectric control and safety shut-off device shown in Figure 1;

Figure 3 is a bottom plan view of the electromagnetic operating unit taken substantially on the line 3—3 of Figure 5 and showing the valve member, its operating lever, and the hinge mounting for the valve operating lever;

Figure 4 is a vertical transverse section on an enlarged scale and taken substantially on the line 4—4 of Figure 5, with the sealing cover for the energy storing means removed;

Figure 5 is a vertical longitudinal section, also on an enlarged scale, taken substantially on the line 5—5 of Figure 2;

Figure 8 is a diagram roughly illustrating the pull curve characteristics of an ordinary U-shaped magnet frame of given section as compared with the pull curve characteristics of the magnet frame of the present invention with its pole of increased area.

Figure 6:
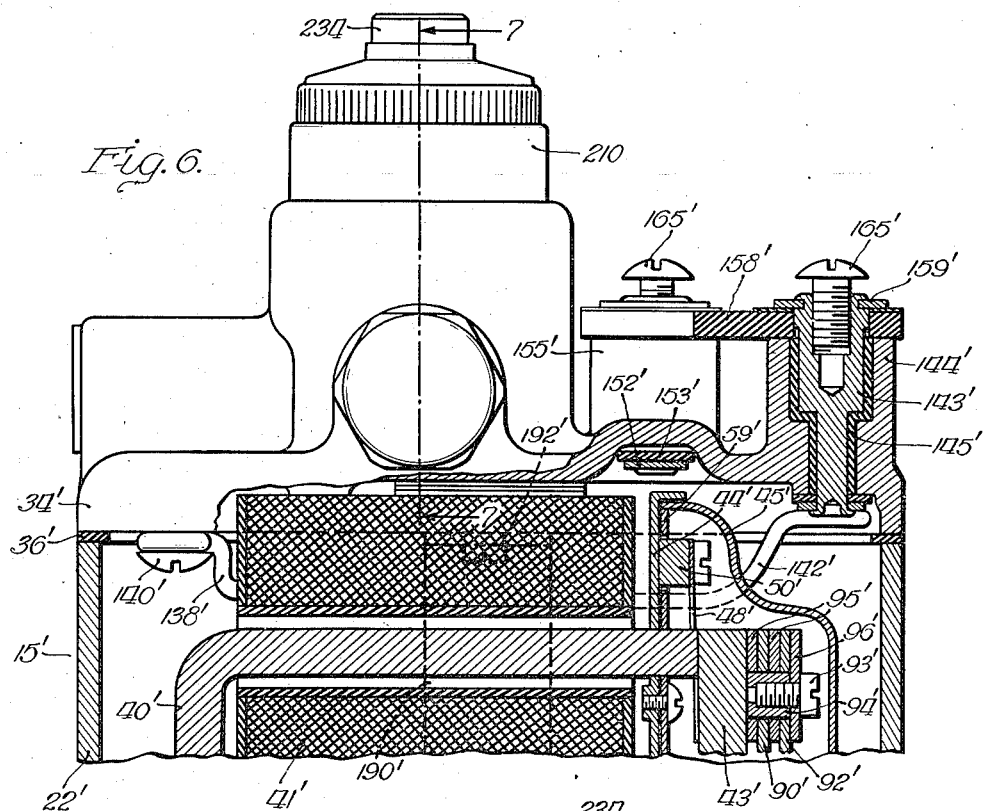
Figure 6 is a fragmentary section similar to Figure 5 and showing another embodiment of the invention.

Referring first to the embodiment of the invention shown in Figures 1 to 5, inclusive, of the drawings, in Figure 1 the burner 10 is any suitable or preferred main burner. It may be the main burner for a room or space heater, or it may be the burner for a water heater, or for a floor furnace, an oven burner, one or more top burners for a gas range, or any other burner. A fuel supply pipe 11 leads to the burner 10 for the delivery of gaseous or other fuel thereto—for example, through a mixing chamber 12 to which air is admitted in the usual way, as well understood in the art.

Interposed in the fuel supply pipe 11 is the thermoelectric control and safety shut-off device indicated in its entirety at 15 in Figure 1. The device 15 is responsive to the pilot burner 16. It may also be responsive to a control device 17 shown, for purposes of illustration in Figure 1, as a thermostatically actuated switch which, in the case of a hot water heater, may be subject to the temperature of the water in the tank, or, in the case of a room or space heater or floor furnace, may be mounted in appropriate position within the room or other space heated by the burner 10. Instead of being in the form of a thermostatically actuated switch, the control device 17 may be of a character to operate, for example, upon the occurrence of an abnormal pressure in the tank of a hot water heater, or upon the occurrence of any other abnormal, defective, or insufficient functioning of the apparatus. The room or space or portion of the apparatus or system to which the temperature or other condition of which the control device 17 is subject is indicated more or less diagrammatically by dot and dash lines 18 in Figure 1.

The pilot burner 16, which is located in juxta-position to the main burner 10 to maintain a pilot flame for igniting the main burner, is supplied with gaseous fuel by a pilot supply pipe 19 which is shown as leading from the housing or case of the thermoelectric control and safety shut-off device 15. This may vary within the scope of the present invention.

Referring now in detail to the thermoelectric control and safety shut-off device 15, the housing or case 22 for this device has an inlet at 23 and an outlet at 24. The inlet 23 opens into the interior of the housing, and a partition or wall 25 separates the interior of the housing from the outlet 24. The partition 25 has an opening into which is threaded a retaining ring 26 which secures a valve seat member 27 in place. The valve seat member 27 defines an opening 28 for placing the interior of the housing 22 in communication with the outlet 24. The upper end of the valve seat member 27 is provided with an annular valve seat 29 upon which the shut-off valve disc 30 is adapted to seat to shut off the supply of fuel to the burner 10. A gasket may be provided at 31.

Contiguous sections of the fuel supply pipe 11 are connected to the inlet at 23 and to the outlet at 24, as shown in Figure 1. A cover 34 is removably secured upon and closes the top of the housing 22. The cover 34 is shown as secured to the housing 22 by screws 35, and a cover gasket may be provided at 36.

The electromagnetic operator for the valve or controlling member and the valve, valve lever, and energy storing means constitute a unitary assembly which is carried by the cover 34, preferably resiliently, as will hereinafter appear. This assembly is enclosed within the housing 22 when the cover 34 is applied, and is removable from the housing by removing the cover.

The electromagnetic operator includes an electromagnet consisting of a magnet frame 40 shown as of generally U-shaped form, although this may vary. The coil 41 is shown as wound around one leg of the magnet frame, and the end of the other leg of the magnet frame is shown as turned at 42 to position generally parallel to the armature 43 to present a relatively large pole face to the armature.

The ends of the magnet frame 40 extend through openings in a sealing plate 44, the margin of which is turned or flanged laterally to receive a sealing cover 45 between which and the plate 44 the pole faces of the magnet frame 40, the armature 43, and the energy storing means are enclosed and sealed. The armature 43 is hinged by hinge means 48 to a spacer 50 fixed to or integral with the sealing plate 44. The hinge means 48 hinges the armature 43 in position adjacent the pole faces of the magnet frame, and the hinge means 48 is preferably of spring character to maintain the armature in the desired position. The cover 45 is removably secured to the sealing plate, for example, by screws 52, and the cover, when in place, may limit movement of the armature away from the electromagnet.

The magnet frame 40 is mounted on and carried by a mounting plate 56 which has a downturned lug 57 positioned against the back of the downturned end 42 of the magnet frame. Screws 58 secure the sealing plate 44 to the downturned lug 57 on the mounting plate 56. A sealing gasket is preferably provided at 59.

The armature 43 and the downturned end 42 of the magnet frame have registering openings 62. A plunger 63, movable endwise in these openings, is secured to the center of a flexible diaphragm 64 by a diaphragm pin 65. The diaphragm 64 is clamped in place to the back of the downturned lug 57 on the mounting plate 56 by a retaining plate 66 which may be secured in place by the lower screws 58 and cooperating nuts (not shown), or otherwise as desired. The retaining plate 66 and the downturned lug 57 of the mounting plate 56 have registering openings and the diaphragm 64 seals the space between the sealing plate 44 and the cover 45 against the entry of deleterious matter through the openings 62.

A valve or controlling member operating lever 70 is hinged at 72, 72 (Figure 3) by a pair of hinge springs 73 to lugs on the sealing plate 44, or to lugs on a mounting plate secured in place with the sealing plate. The opposite ends of the hinge springs 73 are secured, for example, at 74 to lateral lugs on the operating lever 70. The lever 70 has a lug 76 offset upwardly therefrom, and the valve disc member 30 or controlling member is secured to this lug 76 by a valve disc screw 78. The reduced outer end of the lug 76 engages in a slot 79 in the downturned lug 80 on the mounting plate 56. Engagement of the reduced outer end of the lug 76 with the lug 80 at the bottom of the slot 79 serves to prevent undue separation of the valve disc 30 from the mounting plate 56 and electromagnetic operator assembly, particularly when the assembly is removed from the housing 22.

At its opposite end the lever 70 is provided centrally between its opposite sides with a downwardly offset lug 82 having a pointed end for engagement at 83 with the adjacent end of the diaphragm pin 65. The lever 70, being hinged or fulcrumed close to pointed engagement at 83 with the plunger 63, provides for imparting relatively great movement to the valve disc 30 with relatively slight movement of the plunger 63. The mounting plate 56 has an opening 85, and a relatively light coiled spring 86 is disposed through this opening between the magnet frame 40 and the lever 70 for returning the valve disc 30 to closed position upon deenergization of the electromagnet. The thermoelectric control and safety shut-off device is preferably positioned vertically in use, as shown in Figures 1 and 5, in which case I contemplate returning the valve disc 30 to closed position by gravity and without the use of a spring, such as the spring 86, or by gravity in conjunction with the spring 86, or otherwise as desired. A circular raised portion 87 on the lever 70 engages in the lower end convolution of the spring 86 for holding the lower end of the spring in place and against lateral displacement.

It will be noted that the gas pressure within the housing 22 acting upon the top of the valve disc 30 holds the valve disc to its seat 29. When the valve is closed, it requires the greatest force to lift it or move it from its seat 29, and as the valve disc 30 is lifted or moved away from its seat the drop in pressure across the valve causes a rapid drop in the force required to continue movement of the valve disc 30 to full open position.

The energy storing means is shown as comprising a pair of flat leaf springs 90 and 92 normally disposed in substantially parallel relation. The upper ends of these leaf springs 90 and 92 are attached to the armature 43, for example, by a screw 93 threaded into an armature bushing 94, which bushing 94 in turn is suitably secured or fixed to the armature 43. Spacers are provided at 95, one between the armature 43 and the spring 90, and the other between the spring 90 and the spring 92. A retaining clamp 96 is provided between the spring 92 and the head of the screw 93.

An adjusting pressure screw 98, threaded through the spring 90 near its lower end, has endwise engagement with the plunger 63, preferably extending into an axial opening in the plunger as shown in Figure 5. A second adjusting pressure screw 100 is threaded through the spring 92 near its lower end, and the pointed inner end of the screw 100 is adapted to engage or contact the spring 90 after initial tensioning of the spring 90, as will presently appear. In that the spring 90 alone is tensioned in the initial movement of the armature from retracted to attracted position, the pointed inner end of the screw 100 is normally spaced from or out of contact with the spring 90 as shown, for example, more or less diagrammatically in Figure 5. The screws 98 and 100 are adjustable to adjust the action of the device, and may be locked in adjusted positions as desired, tension clamps being indicated more or less diagrammatically at 102 and 103 respectively. The spring 92 has an opening 104 which operates over the head of the screw 98 to permit movement of the spring 92 toward the spring 90 and free of the spring 90 in the initial movement of the armature to attracted position.

The top of the housing 22 is shown as provided with an outlet 110 to which the pilot supply pipe 19 is adapted to be connected by a threaded coupling or union member 112 for delivering gaseous fuel to the pilot burner 16. The outlet 110 is shown as provided with a pipe cap 114 which, of course, is removed in connecting the pilot supply pipe 19 to the outlet 110.

For purposes of illustration, the thermoelectric generator, which is energized by the heat of the pilot flame for supplying thermoelectric current to the thermoelectric operating circuit for energizing the electromagnet, is shown more or less diagrammatically as a thermopile 115 comprising a plurality of thermocouples—three being shown—connected in series. This, of course, may vary within the scope of the present invention, any thermoelectric generator which will generate the required thermoelectric current being contemplated within the scope of the appended claims.

Suffice it for purposes of the present application to state that each of the three thermocouples of the thermoelectric generator 115 comprises the usual or any suitable elements 116 and 117 of different thermoelectric characteristics, each pair of said elements being joined at 118 to provide the "hot junctions" which are placed in position to be heated by the pilot flame as long as the pilot flame is burning. Any other suitable thermoelectric or electric generator may be employed.

The lead conductors for the thermoelectric generator may be of the type more fully disclosed in Oscar J. Leins Patent No. 2,126,564, granted August 9, 1938, or the construction of the thermoelectric leads may be of any other suitable or preferred form.

For the purpose of this description, suffice it to state that the thermoelectric lead conductors comprise an inner lead conductor 125 and an outer tubular lead conductor 126 surrounding the inner lead conductor. The inner lead conductor is insulated from the outer lead conductor, for instance, by a wrapping of insulation 127 (Figure 4) on the inner lead conductor. One terminal of the thermoelectric generator is shown more or less diagrammatically as connected at 128 to the outer tubular lead conductor 126. The other terminal of the thermoelectric generator is shown as connected at 130 to the inner lead conductor 125.

A quick detachable or removable connection is preferably provided between the electromagnet of the thermoelectric control and safety shut-off device and the ends of the leads 125 and 126 opposite the ends which are connected to the thermoelectric generator. This removable lead connection may be of the form disclosed in the copending application of Richard K. Engholdt, Serial No. 328,923, filed April 10, 1940. Suffice it, for purposes of this description, to state that the inner lead 125 has a connector cone 128 which seats in the correspondingly recessed outer end of the terminal tip 130, and is clamped in contact therewith by a connector sleeve 132. The adjacent end of the outer tubular lead conductor 126 is grounded to the cover 34 of the housing 22 through a bushing 133 and the connector sleeve 132 to the internally threaded boss 134 on the cover 34.

One end 138 of the coil 41 (Figure 5) is secured to the under side of the cover 34 by a binding screw 140, and thereby is grounded to the cover 34 and thus connected to the outer lead conductor 126. The other end 142 of the coil 41 is connected to a terminal post 143 fixed in a boss 144 on the cover 14 and insulated therefrom by a terminal bushing 145. The terminal tip 130, which is insulated from the cover by an insulator bushing 148, is connected in circuit with a second terminal post 150 by a connector strip 152. An insulator strip is provided at 153 (Figure 4). The terminal post 150 is fixed in a boss 155 on the cover 34 and is insulated therefrom by a terminal insulator 156. An insulating terminal board 158 is mounted across the tops of the bosses 144 and 155, suitable washers being provided at 159, and the upper ends of the terminal posts 143 and 150 being peened over or otherwise formed to secure the terminal board in place.

Where a thermostat or other condition responsive device is employed as indicated at 17 in Figure 1, the leads 162 and 163 for this device are connected to the terminal posts 143 and 150, by suitable binding screws 165. The thermostat or other condition responsive device 17 is thus placed in series circuit relation with the thermoelectric generator and the coil 41 of the electromagnet.

To assure accurate positioning of the valve disc 30 or other controlling member with respect to the valve seat 29 or cooperating part and independently, for example, of the attachment of the cover 34 to the housing 22, I provide a resilient mounting for the electromagnetic operator assembly. This resilient mounting comprises four vertically elongated screws or posts having heads disposed beneath the mounting plate 56 and their shanks extending up relatively loosely through openings in the mounting plate. The upper ends of the screws or posts 175 have threaded engagement at 176 with the cover 34, and springs 178 are coiled about the respective posts and interposed between the cover 34 and the mounting plate 56. When the cover 34 is applied, the electromagnetic operator is positioned within the housing 22 and the mounting plate 56 seats upon horizontal seating surfaces 180 on the interior of the housing 22, thus assuring accurate positioning of the valve disc with respect to its valve seat 29. The cover 34 may be clamped in place, and any improper fit of the cover or non-uniformity in the clamping of the same in place will not disturb the proper positioning of the valve disc 30. The heads at the lower ends of the screws or posts 175 are shown in Figure 4 as spaced below the mounting plate 56 and as positioned in recesses 182 in the housing 22.

The magnet frame 40 and the armature 43 are preferably formed of an alloy of relatively low magnetic reluctance, and the operating circuit for the device is preferably of low resistance characteristics.

The operation of the device is as follows:

Assume that the pilot light is lighted and heating the "hot" junctions 118 of the thermoelectric generator to supply the operating thermoelectric current to the circuit for energizing the electromagnet, and that the thermostat or other condition responsive device at 17 has operated to open or disable the thermoelectric circuit to deenergize the electromagnet. The armature 43 is then positioned in retracted position with an air gap between it and the magnet frame by the screw 98 and plunger 63 pushing against the diaphragm pin 65 and point 83 on the valve lever 70, the armature and energy storing springs 90 and 92 being positioned substantially as shown in Figure 5. The valve disc 30 will be closed upon its seat 29 to shut off the supply of fuel to the burner, and will be held closed by the pressure of the gas within the housing 22.

Now, when the thermostat or other condition responsive device 17 operates to close or enable the thermoelectric circuit, the heat of the pilot flame on the thermoelectric generator will supply the thermoelectric current for energizing the electromagnet. When the electromagnet is energized, the armature 43 is pulled toward the pole faces of the magnet frame by the magnetic attraction. The lower end of the energy storing spring 90 is held against following the armature by engagement of the adjusting pressure screw 98 with the plunger 63, which in turn is prevented from moving by the gas pressure acting on the valve disc 30, said valve disc being operatively connected to the spring 90 by means of the adjusting screw 98, plunger 63, fulcrum 83, pivot point 72, and lever 70. As a result, the spring 90 is tensioned by a scissors-like action or separation of the lower end of the armature 43 from the lower end of the spring 90.

The lower end of the second spring 92, being free, follows the movement of the armature 43 without tensioning of the second spring in the initial movement of the armature to attracted position. As the armature 43 moves toward the pole faces of the magnet frame and after initial tensioning of the spring 90, the pressure adjusting screw 100 carried by the spring 92 contacts the spring 90. Further movement of the armature 43 toward attracted position thereupon further tensions the spring 90, and at the same time tensions or stores up energy in the second spring 92. At the time when the movement of the armature 43 to attracted position is tensioning only the spring 90, the magnetic attraction is least, and when the movement of the armature is tensioning both springs 90 and 92, the armature is closer to the magnet frame and the magnetic attraction is greater. The tension in the leaf springs 90 and 92 is built up or energy is stored until the combined tension or energy in both springs is sufficient to lift or open the valve disc 30 against the gas pressure, whereupon the stored energy operates to open the valve quickly and effectively to set up the supply of fuel to the burner 10. As the valve disc 30 begins to lift or open, the pressure across it drops and leaf spring 90 continues to lift the valve and moves away from the spring 92—that is, the point of the pressure screw 100 loses contact with the spring 90.

The position of the armature 43 when the valve disc 30 is being lifted depends upon the gas pressure across the valve disc—that is, the greater the gas pressure the further the armature moves toward the pole faces of the magnet frame before the valve disc begins to open. The force or energy in the leaf springs 90 and 92 must exceed the combined force of the gas pressure and other counteracting forces before the valve disc 30 can be opened. It should be borne in mind that neither spring 90 nor 92 is stressed when the valve disc 30 is in the closed position—that is, on the valve seat. The spring 90 is slightly stressed when the valve disc is in the open position. This is caused by the pressure drop across the valve, the weight of the valve and the force of spring 86. However, spring 92 is not tensioned at this time because the point of the screw 100 is not in contact with the spring 90. The energy storing means presents to the armature, in all positions thereof, in its movement to attracted position a resistance less than the magnetic attraction betwen the electromagnet and the armature at the corresponding position of the armature, and therefore the energy storing means does not prevent or obstruct movement of the armature to attracted position.

If, for any reason, the pilot burner is extinguished with the thermostatic or other condition responsive switch at 17 closed, the resulting discontinuance of the thermoelectric current results in deenergization of the electromagnet and the armature is actuated to retracted position, allowing the valve disc 30 to move to closed position upon its seat 29 to shut off the supply of fuel to the burner 10. When the pilot burner is reignited, the heat of the pilot flame will energize the electromagnet, whereupon the valve will be automatically operated to open position in the manner already described.

The invention may be practiced without the aid of two springs, namely, by using one spring. However, the action of the various forces must then be changed. In other words, the force exerted by any arrangement of spring or springs or other energy storing means must be less than or equal to the pull of the electromagnet at all points of the operating range of the air gap in order to get the maximum lift of the valve disc 30.

In Figure 5 I have shown a coil clamp 190 attached to the cover 34 by screws 192 for clamping the coil in place, a coil insulator being shown at 193. The coil is thus independently mounted on the cover so that, in shipping, forces tending to distort the magnet frame are prevented from doing so.

The increased area of the pole face presented by the pole 42 of the magnet frame is preferably larger than the cross-sectional area of the body of the magnet frame. I have found by tests that with this pole face of increased area an improved pull curve of the electromagnet is developed.

In Figure 8 of the drawings, the curves are roughly drawn to bring out, in general, the character of the change in pull curve in changing from an ordinary U-shaped magnet of given section to a magnet of equal section with an enlarged pole face, such as the enlarged pole face presented by the magnet pole 42 as shown in the drawings.

Referring to Figure 8, a U-shaped magnet with pole faces having areas equal to the low reluctance path area will develop a pull curve roughly like the curve CE. In such a magnet the magnetic pull AC is more than the necessary force to open a valve if the value of DE were large enough to be used practically. By increasing the pole face area of the magnet pole 42 so that it is larger than the cross-sectional area of the body of the magnet frame, I develop a curve roughly and generally shown in Figure 8 as the curve BF. The value AB of this latter curve, while less than the value AC of the curve CE, is ample for starting the valve to open position. The value DF of the curve BF is ample for bringing the valve to its top position. In order to develop a force at maximum lift equal to the required force DF with an ordinary U-shaped magnet frame, it would be necessary to operate on an air gap equal to AH instead of on the larger air gap AD. With the improved pull curve developed by the device of my present invention, it is possible to operate with a wider air gap or greater separation of the armature from the pole 42 when the armature is in retracted position, and this wider air gap AD is sufficient to be used practically for the purposes and with the advantages herein set forth.

Referring again to Figure 8, curve BF represents roughly the curve of force required to open a fluid-sealed valve against fluid pressure, the force required to start the valve disc from closed position being near the left end of that curve, and the force required to lift the valve disc to the limited opening required being shown near the right end of curve BF. It is apparent that the air gap scale of the chart represents valve disc travel, and the magnetic pull scale of the chart represents force tending to close the valve. A curve of this character showing the forces required to open the valve will herein be called the curve of valve opening force.

Also, curve BF shows drop-out at a higher current value in the electromagnet coil than the curve CE because the value AB is less than the value AC.

Figure 7:
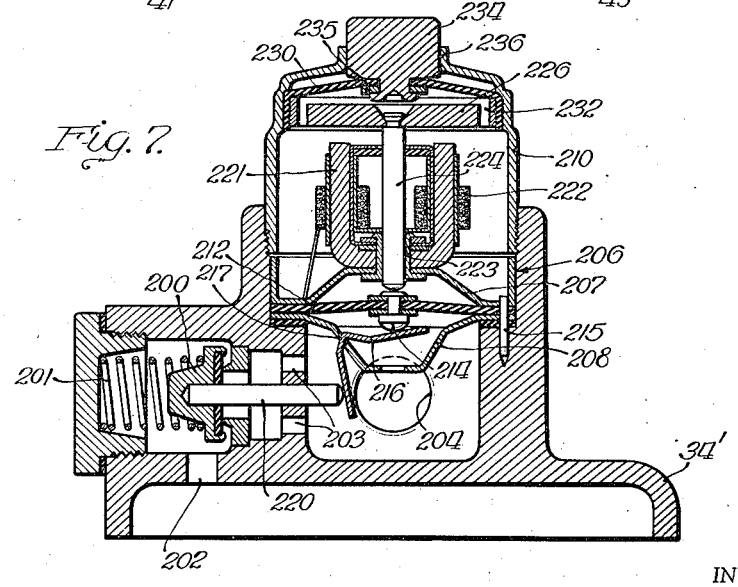
Figure 7 is a fragmentary vertical section taken on the line 7—7 of Figure 6.

The embodiment of the invention shown in Figures 6 and 7 is similar to the embodiment shown in Figures 1 to 5, inclusive, except that the pilot outlet thereof is provided with a valve for shutting off the supply of fuel to the pilot burner when said pilot burner is extinguished. The parts of Figures 6 and 7 which correspond in construction and function with parts of the embodiment of the invention shown in Figures 1 to 5, inclusive, are designated by primed reference characters corresponding with the reference characters used in connection with Figures 1 to 5, inclusive.

By reference to Figure 7 it will be seen that the pilot valve member 200 is urged toward its seat and toward a closed position by a coiled spring 201. The valve member 200 will be in an open position only when the pilot light is burning, and, when in open position, the fuel for the pilot burner passes from the housing 22' through an opening 202 and thence through the opening defined by the valve seat member and through openings 203 and an outlet 204 into the pilot supply pipe leading to the pilot burner.

The cover 34' has a boss provided with a bore 206. A magnet support 207 and a lever support 208 are clamped in place in the inner end of the bore 206 by a generally cup-shaped member 210 threaded at its inner end into the outer end of the bore 206. A flexible diaphragm 212, clamped in place marginally between the members 207 and 208, carries a diaphragm pin 214. A dowel pin may be provided at 215. A lever 216 is fulcrumed at 217 on the lever support 208 and has one end positioned to be actuated by the diaphragm pin 214, and its other end is positioned to actuate the plunger or stem 220 for the valve member 200.

An electromagnet is housed within the member 210 and comprises a magnetic frame 221, shown of generally U-shaped form, and an energizing coil 222. The magnet frame 221 is attached by a sleeve member 223 to the center of the raised bottom portion of the magnet support 207. An armature stem 224 passes slidingly through the sleeve 223 and has an armature mounted on its outer end preferably for relative movement on the stem 224 so that the armature may accommodate itself to the pole faces of the magnet frame when in attracted position. The inner end of the armature stem 224 contacts the diaphragm pin 214.

A flexible diaphragm 230 is secured marginally in the outer end of the member 210 by a retainer ring 232, and a reset button 234 is secured at 235 to the center of the diaphragm 230. The reset button projects slidingly through an opening 236 in the outer end of the member 210. When the button 234 is engaged by the finger and pressed inwardly, it moves the armature 226 to attracted position, and the accompanying inward movement of the stem 224 swings the lever 216 in a clockwise direction about its fulcrum 217, the engagement of the lever 216 with the valve stem 220 moving the valve 200 to open position against the action of the spring 201 when the reset button is pressed inwardly.

The energizing coil 222 for the pilot valve electromagnet is preferably connected in parallel circuit relation with the thermoelectric generator as an independent circuit. This permits the thermostat or other condition responsive device at 17, for example, to operate to deenergize the electromagnet for the main valve without deenergizing the electromagnet for the pilot valve. When the pilot light is extinguished, both the main valve and the pilot valve operate to closed position. The spring 201 closes the valve 200 when the electromagnet therefor is deenergized, and, through the stem or plunger 220, lever 216, diaphragm pin 214, and armature stem 224, moves the armature to retracted position and the reset button to its outwardly projected position as shown in Figure 7. When the reset button is pressed inwardly in resetting or cocking the device, the armature is moved to attracted position, and assuming that the electromagnet is sufficiently energized by the heat of the pilot flame on the thermoelectric generator, the armature will be held magnetically in attracted position, thus holding the pilot valve open as long as the pilot light is burning.

As thus described, the pilot generator shown, for example, at 115 in Figure 1 supplies the thermoelectric current for energizing the electromagnet for the pilot valve, as well as the electromagnet for the main valve. It is to be understood that this may vary. For example, the use of separate thermoelectric generators for the two electromagnets is contemplated.

I have determined, by experiment, that in one preferred embodiment of the invention the ratio of the air gap with the armature in retracted position to the length of air gap with the armature in attracted position is preferably approximately over three times the ratio of pull with the armature in attracted position to the pull with the armature in retracted position.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. In combination, a member having a predetermined first stationary position and movable therefrom to a second position, an electromagnet and an armature therefor having a retracted position and an attracted position, energy storing means connected to said member and reacting in a direction for moving it from its said first stationary position to its said second position, and connections between said armature and said means whereby the energy stored thereby increases in the movement of said armature toward said electromagnet responsive to energization thereof, the energy stored in said energy storing means by movement of said armature to said electromagnet becoming effective for moving said member from its said first position when said armature approaches its fully attracted position.

2. In combination, a member having a predetermined first stationary position and movable therefrom to a second position, an electromagnet and an armature therefor having a retracted position and an attracted position, and means for storing, by movement of said armature to attracted position, energy reacting in a direction for moving and effective to move said member from its said first stationary position to its said second position when said armature approaches its fully attracted position, said energy storing means presenting to said armature in all positions thereof in its movement to attracted position resistance less than the magnetic attraction between said electromagnet and said armature.

3. In combination, an electromagnet comprising a magnet frame, a coil for said magnet frame, an armature hinged adjacent said electromagnet and having a retracted position and movable to attracted position upon energization of the electromagnet, a pair of leaf springs attached at one end to the armature, the other end of one of said leaf springs being free of the armature and adapted to be tensioned by initial movement of the armature to attracted position, the adjacent end of the other leaf spring being free during initial tensioning of said first leaf spring and having means cooperating with said first leaf spring after initial tensioning of said first spring for thereafter tensioning said second spring, and a member movable from a first stationary position to a second position by the combined tension set up in said springs by movement of said armature to attracted position and after said armature is in position at which both of said springs are tensioned and the magnetic attraction between said electromagnet and said armature is increased.

4. In combination, an electromagnet comprising a magnet frame, a coil for said magnet frame, an armature hinged adjacent said electromagnet and having a retracted position and movable to attracted position upon energization of the electromagnet, a pair of leaf springs attached at one end to the armature, the other end of one of said leaf springs being free of the armature and adapted to be tensioned by initial movement of the armature to attracted position, the adjacent end of the other leaf spring being free during initial tensioning of said first leaf spring and having means cooperating with said first leaf spring after initial tensioning of said first spring for thereafter tensioning said second spring, and a member movable from a first stationary position to a second position by the combined tension set up in said springs by movement of said armature to attracted position and after said armature is in position at which both of said springs are tensioned and the magnetic attraction between said electromagnet and said armature is increased, the means on said second leaf spring which cooperates with said first leaf spring being adjustable to adjust the position at which the movement of the armature acts to tension said second spring.

5. In combination, an electromagnet, an armature hinged adjacent said electromagnet and having a retracted position and movable to attracted position upon energization of the electromagnet, a member movable from a first position to a second position, a pair of leaf springs carried by said armature, operating connections between said member and one of said leaf springs, said latter leaf spring being tensioned by initial movement of the armature to attracted position, and means on the other leaf spring free of said first leaf spring during initial tensioning thereof and cooperable with said first leaf spring to tension the same after initial tensioning of said first spring and until the combined tension in said springs is sufficient to operate said control member.

6. In combination, an electromagnet, an armature pivoted adjacent said electromagnet and having a retracted position and movable to attracted position upon energization of the electromagnet, said armature having an opening therethrough, a member movable from a first position to a second position, a pair of leaf springs carried by said armature, one of said springs being tensioned by initial movement of the armature to attracted position and having adjustable operating connections through said opening to said member and the other spring being free during initial movement of the armature and tensioned by the movement of the armature to attracted position after initial tensioning of said first spring and until the combined tension in said springs is sufficient to move said member from its said first position to its said second position, and means on said second spring for adjustable cooperation with said first spring.

7. In combination, a member having a predetermined stationary first position and movable therefrom to a second position, an electromagnet and an armature therefor having a retracted position and an attracted position, and means for moving said member from its said first stationary position to its said second position upon movement of said armature to attracted position responsive to energization of said electromagnet, said means comprising spring means placed under increasing tension by the movement of said armature to attracted position and reacting in a direction for moving and becoming effective to move said member from its said first position to its said second position as said armature approaches its fully attracted position, said spring means being effective to hold said member in its said second position so long as said electromagnet remains energized and said armature remains in attracted position.

8. In combination, a member having a predetermined stationary first position and movable therefrom to a second position, an electromagnet and an armature therefor having a retracted position and an attracted position, and means for moving said member from its said first position to its said second position upon movement of said armature to attracted position responsive to energization of said electromagnet, said means comprising a plurality of similarly acting springs successively placed under increasing tension by the movement of said armature to attracted position and effective to move said member from its said first position to its said second position as said armature approaches its fully attracted position, said spring means being effective to hold said member in its said second position so long as said electromagnet remains energized and said armature remains in attracted position.

9. In combination, a member having a predetermined stationary first portion and movable therefrom to a second position, an electromagnet and an armature therefor having a retracted position and an attracted position, spring means comprising a plurality of similarly acting leaf springs carried by said armature, and operating connections between said spring means and said member comprising means for successively placing said springs under increasing tension by the movement of said armature toward attracted position, the energy stored by said springs being effective for moving said member from its said first position to its said second position when said armature approaches its fully attracted position, said spring means being effective for holding said member in its said second position so long as said electromagnet remains energized and said armature remains in its attracted position.

10. In combination, a member having a first position and movable therefrom to a second position, an electromagnet and an armature therefor having a retracted position and an attracted position, and means for moving said member from its said first position comprising energy storing means presenting minimum resistance to movement of said armature to attracted position at the initiation of such movement and increasing resistance during continuation of such movement, said energy storing means reacting in a direction and becoming effective for moving said member from its said first position when said armature approaches its fully attracted position.

11. In combination, a member having a predetermined stationary first position and movable therefrom to a second position, an electromagnet and an armature therefor having a retracted position and an attracted position, and means for moving said member from its said first stationary position to its said second position upon movement of said armature to attracted position responsive to energization of said electromagnet, said means comprising spring means under minimum tension when said member is in its said first position and said armature is in its retracted position, said spring means being placed under increasing tension by movement of said armature toward attracted position and reacting in a direction and becoming effective for moving said member from its said first position when said armature approaches its fully attracted position.

12. In combination, a member having a predetermined stationary first position and movable therefrom to a second position, an electromagnet and an armature therefor having a retracted position and an attracted position, and means for moving said member from its said first position to its said second position upon movement of said armature to attracted position responsive to energization of said electromagnet, said means comprising a plurality of similarly acting springs under minimum tension when said member is in its said first position and said armature is in its retracted positon, said springs being successively placed under increasing tension by movement of said armature to attracted position and becoming effective to move said member from its said first position as said armature approaches its fully attracted position.

13. In combination, a member having a predetermined stationary first position and movable therefrom to a second position, an electromagnet and an armature therefor having a retracted position and an attracted position, and means for moving said member from its said first position to its said second position upon movement of said armature to attracted position responsive to energization of said electromagnet, said means comprising a plurality of similarly acting leaf springs carried by said armature under minimum tension when said member is in its said first position and said armature is in its retracted position, said springs being successively placed under increasing tension by movement of said armature to attracted position and becoming effective to move said member from its said first position as said armature approaches its fully attracted position.

LOURDES V. McCARTY.